United States Patent [19]

Sakashita et al.

[11] Patent Number: 5,187,242

[45] Date of Patent: Feb. 16, 1993

[54] POLYCARBONATE, POLYESTERCARBONATE RESIN COMPOUNDS AND PREPARING METHODS THEREOF

[75] Inventors: Takeshi Sakashita, Iwakuni City; Tomoaki Shimoda, Kuga; Takashi Nagai, Otake City; Kotarou Kishimura, Iwakuni City, all of Japan

[73] Assignee: General Electric Company, Mt. Vernon, Ind.

[21] Appl. No.: 627,125

[22] Filed: Dec. 13, 1990

[30] Foreign Application Priority Data

Dec. 28, 1989 [JP] Japan .................................. 1-344041

[51] Int. Cl.⁵ ...................... C08L 69/00; C08L 67/02; C08G 81/00
[52] U.S. Cl. ..................................... 525/439; 528/176
[58] Field of Search ......................... 525/439; 528/176

[56] References Cited

U.S. PATENT DOCUMENTS

| 3,218,372 | 11/1965 | Okamura | 260/860 |
| 3,313,862 | 4/1967 | Siggel | 528/176 |
| 4,533,702 | 8/1985 | Freitag | 528/176 |
| 4,590,257 | 5/1986 | Brunelle | 528/200 |
| 4,598,129 | 7/1986 | Borman | 525/439 |
| 4,814,421 | 3/1989 | Rosenquist | 525/439 |
| 5,010,146 | 4/1991 | Kohsaka | 525/439 |
| 5,026,817 | 6/1991 | Sakashita | 528/199 |
| 5,055,523 | 10/1991 | Inoue | 525/439 |

FOREIGN PATENT DOCUMENTS 0130512 1/1985 European Pat. Off. .
2919629 11/1980 Fed. Rep. of Germany .
2343778 10/1977 France .

Primary Examiner—David J. Buttner
Attorney, Agent, or Firm—Martin B. Barancik

[57] ABSTRACT

A polycarbonate composition which contains 60-95 parts by weight of a polycarbonate with a terminal hydroxyl group concentration of 5-95 mol % and 40-5 parts by weight of polyester.

2 Claims, No Drawings

POLYCARBONATE, POLYESTERCARBONATE RESIN COMPOUNDS AND PREPARING METHODS THEREOF

DETAILED EXPLANATION OF THE INVENTION

1. Industrial Application Field

The present invention concerns a polycarbonate compound or polyester-polycarbonate compound which has excellent transparency, impact resistance, and fluidity as well as its manufacturing method.

2. Technical Background

Since polycarbonate has excellent transparency and impact resistance, said polymer is used extensively as a container material. If said polymer is used alone, however, the fluidity is generally inferior. Thus, the moldability is questionable. A method in which the molecular weight of polycarbonate is minimized has been proposed as a technique for enhancing the fluidity. If this method is implemented, however, the impact resistance inevitably deteriorates.

A polycarbonate compound which consists of polycarbonate and polyester (e.g., polybutylene terephthalate, polyethylene terephthalate, etc.), has been proposed as a resin compound which has excellent transparency and impact resistance characteristic of polycarbonate as well as an excellent moldability (see Japanese Kokai Patents Nos. Sho 48[1973]-54160 and Sho 49[1974]-107354 and Japanese Kokoku Patent No. Sho 58[1983]-18391).

The transparency of the aforementioned conventional resin compounds, however, are less than satisfactory. As the polyester concentration increases, furthermore, the impact resistance significantly deteriorates. More specifically, it is virtually impossible to induce a polycondensing reaction between the polycarbonate and polyester as a result of tranesterification within said resin compound.

A resin compound obtained by reacting a polycarbonate and a polyester (or their oligomers) in the presence of a catalyst (see Japanese Kokai Patent No. Hei 1[1989]-236235) has also been proposed. The transparency of the aforementioned resin compound is excellent, but since the fluidity is inferior, the moldability is questionable. Moreover, a long reaction period is required, which is undesirable in consideration of an industrial production scheme.

OBJECTIVES OF THE INVENTION

The foremost objective of the present invention, which has been proposed in response to the aforementioned problems inherent in conventional methods, is to provide a polyester-polycarbonate compound which has excellent impact resistance and transparency as well as desirable fluidity and moldability, a polycarbonate compound which is used as a feed material for manufacturing said compound, and a method for manufacturing said compound.

COMPOSITION OF THE INVENTION

The polycarbonate compound and polyester-polycarbonate compound of the present invention contain 60–95 parts by weight of a polycarbonate with a terminal hydroxyl group concentration of 5–95 mol % and 40–5 parts by weight of polyester.

When the method of the present invention for manufacturing said polyester-polycarbonate compound is implemented, 60–95 parts by weight of a polycarbonate with a terminal hydroxyl group concentration of 5–95 mol % and 40–5 parts by weight of polyester are melt-mixed.

As far as the polycarbonate compound of the present invention, polyester-polycarbonate compound, and its manufacturing method are concerned, 60–95 parts by weight of a polycarbonate with a terminal hydroxyl group concentration of 5–95 mol % and 40–5 parts by weight of polyester are used. As a result, a moderate transesterification is induced between the polycarbonate and polyester constituting said compound. As a result, a polyester-polycarbonate compound which has excellent impact resistance and transparency as well as desirable fluidity can be obtained.

DETAILED EXPLANATION OF THE INVENTION

Next, the polycarbonate compound of the present invention, polyester-polycarbonate compound, and its manufacturing method will be explained in full detail.

The polycarbonate compound of the present invention contains a polyester and a polycarbonate characterized by a special hydroxyl group concentration.

In other words, the hydroxyl group concentration with respect to the total terminal group content should be 5–95 mol %, more preferably 20–90 mol %, or most preferably 30–80 mol %, in the polycarbonate used in the present invention.

If the terminal hydroxyl group concentration of the polycarbonate satisfies the aforementioned requirement, said terminal hydroxyl groups function as active site in a process whereby a polycarbonate compound or polyester-polycarbonate compound is manufactured by mixing said polycarbonate with a polyester. If the terminal hydroxyl group concentration of the polycarbonate is kept within the aforementioned range, a moderate transesterifying reaction is induced between the polycarbonate and polyester constituting said compound. As a result, a polycarbonate compound or polyester-polycarbonate compound which has excellent transparency and impact resistance as well as desirable fluidity can be obtained.

As far as the polycarbonate of the present invention is concerned, furthermore, the sodium content should be kept at or below 1.0 ppm, preferably at or below 0.5 ppm, and that the chlorine content should be kept at or below 20 ppm, preferably at or below 10 ppm.

The sodium ion content can be determined by means of atomic absorption analysis and derivative bond plasma light-emitting analysis [sic; possibly plasma desorption mass spectrometry].

As far as the present specification is concerned, the expression "chlorine content" encompasses chlorine which exists as acids (e.g., hydrochloric acid, etc.), salts (e.g., sodium chloride, potassium chloride, etc.), and the chlorine component of organic compounds (e.g., phenyl chloroformate, methylene chloride, etc.). The chlorine content can be determined by means of ion chromatographic analysis.

Even if the terminal hydroxyl group concentration of said polycarbonate with a sodium content of 1.0 ppm or lower (more preferably 0.5 ppm or lower) and a chlorine content of 20 ppm or lower (preferably 10 ppm or lower) is 5–95 mol % (more preferably 20–90 mol % or most preferably 30–80 mol %), excellent heat resistance and water resistance are sustained, and coloration can be effectively inhibited.

Even if the polycarbonate contains terminal hydroxyl groups (i.e., active sites), the reaction of the terminal hydroxyl group can be minimized if the sodium content and chlorine content are maintained at low levels. Thus, the coloration of said polycarbonate can be effectively inhibited.

In the aforementioned polycarbonate, furthermore, the total concentrations of alkali metals other than sodium (e.g., lithium, potassium, cesium, etc.), or alkaline earth metals (e.g., beryllium, magnesium, calcium, etc.), should be controlled at or below 1 ppm. In such a case, the initial hue, water resistance, and heat resistance are optimized.

As far as the polycarbonate of the present invention is concerned, furthermore, the intrinsic viscosity ($\eta$), which is measured in methylene chloride at 20° C., should be kept within 0.3–1.0 dL/g.

Concrete examples of methods for manufacturing the aforementioned polycarbonate include a method in which an aromatic organic compound which has two hydroxyl groups is directly reacted with phosgene (i.e., interfacial method) and a method in which an aromatic organic compound which has two hydroxyl groups and a carbonic acid diester are transesterified (i.e., polycondensation method). The latter method is especially advantageous since the objective polycarbonate can be manufactured at low costs.

Next, desirable procedures for manufacturing a polycarbonate by transesterifying an aromatic organic compound which has two hydroxyl groups and a carbonic acid diester (i.e., polycondensation method) will be explained in further detail.

A compound represented by the following general formula I:

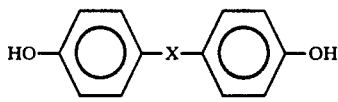

[I]

(in which X is selected from

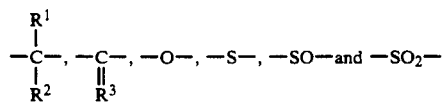

$R^1$ and $R^2$ are selected from a hydrogen atom and univalent hydrocarbon groups; $R^3$ is a divalent hydrocarbon group; the aromatic nucleus may or may not have a univalent hydrocarbon group) can be appropriately used as said aromatic organic compound which has two hydroxyl groups in the aforementioned method for manufacturing a polycarbonate.

Concrete examples of said aromatic organic compounds which have two hydroxyl groups include bis(-hydroxyaryl)alkanes (e.g., bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, etc.), bis(hydroxyaryl)cycloalkanes (e.g., 1,1-bis(4-hydroxyphenyl)cyclopentane, 1,1-bis(4-hydroxyphenyl)cyclohexane, etc.), dihydroxyaryl ethers (e.g., 4,4'-dihydroxydiphenyl ether, 4,4'-dihydroxy-3,3'-dimethylphenyl ether, etc.), dihydroxydiaryl sulfides (e.g., 4,4'-dihydroxydiphenyl sulfide, 4,4'-dihydroxy3,3'-dimethyldiphenyl sulfide, etc.), dihydroxydiaryl sulfoxides (e.g., 4,4'-dihydroxydiphenyl sulfoxide, 4,4'-dihydroxy-3,3'-dimethyldiphenyl sulfoxide, etc.), dihydroxydialkylsulfones (e.g., 4,4'-dihydroxydiphenylsulfone, 4,4'-dihydroxy-3,3'-dimethyldiphenylsulfone, etc.), etc.

Of the aforementioned examples, 2,2'-bis(4-hydroxyphenyl)propane is especially desirable.

Concrete examples of the aforementioned carbonic acid esters include diphenyl carbonate, ditoluyl carbonate, bis(chlorophenyl) carbonate, m-cresyl carbonate, dinaphthyl carbonate, bis(diphenyl) carbonate, diethyl carbonate, dimethyl carbonate, dibutyl carbonate, dicyclohexyl carbonate, etc.

Of the aforementioned examples, diphenyl carbonate is especially desirable.

The aforementioned carbonic acid diester, furthermore, may also contain no more than 50 mol %, preferably no more than 30 mol %, of dicarboxylic acids or dicarboxylic acid esters. Concrete examples of such dicarboxylic acids or dicarboxylic acid esters include terephthalic acid, isophthalic acid, diphenyl terephthalate, diphenyl isophthalate, etc.

If the aforementioned dicarboxylic acids or dicarboxylic acid esters are used in combination with carbonic acid diesters, polyester-polycarbonates are obtained.

The quantity of the aforementioned carbonic acid diester with respect to 1 mol of the aforementioned aromatic organic compound which has two hydroxyl groups should be 1.01–1.30 mol, preferably 1.02–1.20 mol.

When the aforementioned aromatic organic compound which has two hydroxyl groups and the carbonic acid diester are melt-polycondensed, a phenol or carbonic acid diester is added to the reaction system as an end-capping agent to control the terminal hydroxyl group concentration of the resulting polycarbonate.

As said phenols which can be used as end-capping agents, phenols containing 10–40, preferably 15–40, carbon atoms are especially desirable. The quantity of said phenol with respect to the aromatic organic compound which has two hydroxyl groups should be 0.5–20 mol %, preferably 1–15 mol %.

The following are concrete examples of the aforementioned phenols containing 10–40 carbon atoms: o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, 3,5-dicumylphenol,

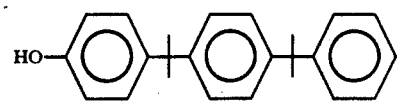

cumarone derivatives (e.g.,

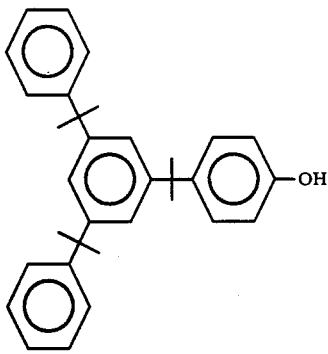

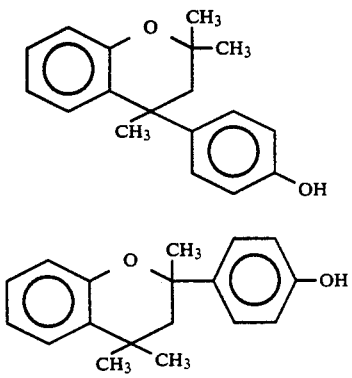

etc.), and other univalent phenols.

Of the aforementioned phenols, binuclear phenols which have two aromatic nuclei are especially desirable. In particular, p-cumylphenol, p-phenylphenol, etc. are ideal.

If a carbonic acid diester is used as an end-capping agent, 0.5-20 mol %, preferably 1-15 mol %, of a carbonic acid diester containing 13-16 carbon atoms or a carbonic acid diester containing 17-50 carbon atoms is added to the resulting system (with respect to the aromatic organic compound which has two hydroxyl groups).

As carbonic acid diesters containing 13-16 carbon atoms, the aforementioned diphenyl carbonates containing 13-16 carbon atoms can be used. In other words, the carbonic acid diester which is used as a feed material (e.g., diphenyl carbonate, phenyltoluyl carbonate, ditoluyl carbonate, etc.), may be identical to or different from the diphenyl carbonate used as an end-capping agent.

As carbonic acid diesters containing 17-50 carbon atoms, compounds represented by the following general formula:

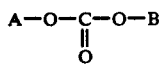

(in which A is a group containing 6-25 carbon atoms; B is a group containing 10-25 carbon atoms; the combined numbers of carbon atoms of A and B are 49 or fewer) are usually used.

The following compounds are concrete examples of the aforementioned carbonic acid diesters: 1)

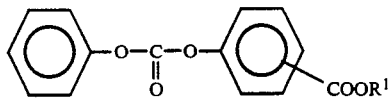

(in which $R^1$ is a hydrocarbon group containing 3-36 carbon atoms), 2)

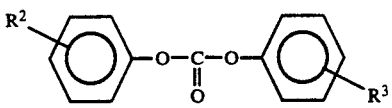

(in which $R^2$ and $R^3$ may be identical to or different from one another; $R^2$ and $R^3$ are hydrocarbon groups containing 1-19 and 3-19 carbon atoms, respectively; the combined numbers of carbon atoms of $R^2$ and $R^3$ are 37 or fewer), 3)

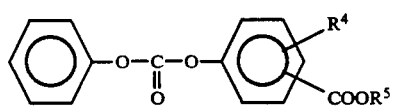

(in which $R^4$ is a hydrocarbon group containing 1-30 carbon atoms; $R^5$ is a hydrocarbon group containing 1-20 carbon atoms; the combined numbers of carbon atoms of $R^4$ and $R^5$ are at least 3 and no more than 36), 4)

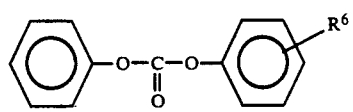

(in which $R^6$ is a hydrocarbon group containing 4-37 carbon atoms), 5)

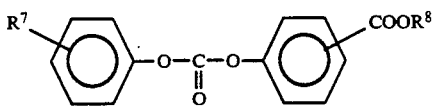

(in which $R^7$ and $R^8$ may be identical to or different from one 1 another; $R^7$ and $R^8$ are hydrocarbon groups containing 1-30 and 2-20 carbon atoms, respectively; the combined numbers of carbon atoms of $R^7$ and $R^8$ are 36 or fewer).

The following are especially desirable examples of the aforementioned carbonic acid diesters: carbobutoxyphenylphenyl carbonate, methylphenylbutylphenyl carbonate, ethylphenylbutylphenyl carbonate, dibutyldiphenyl carbonate, biphenylphenyl carbonate, dibiphenyl carbonate, cumylphenylphenyl carbonate, dicumylphenyl carbonate, naphthylphenylphenyl carbonate, dinaphthylphenyl carbonate, carbopropoxyphenylphenyl carbonate, carboheptoxyphenylphenyl carbonate, carbomethoxy-t-butylphenylphenyl carbonate, carboprotoxyphenylmethylphenylphenyl carbonate, chromanylphenyl carbonate, dichromanyl carbonate, etc.

If the chlorine content of the carbonic acid diester or diphenyl carbonate used as a feed material or end-capping material is kept at or below 20 ppm, it is especially desirable since a polycarbonate with an excellent hue can be obtained.

The aforementioned carbonic acid diester or diphenyl carbonate is washed with hot water at 78°–105° C., more preferably 80°–100° C., or most preferably 80°–90° C., at a pH of 6.0–9.0, more preferably 7.0–8.5, or most preferably 7.0–8.0, to keep the chlorine content of said feed material at or below 20 ppm.

Concrete examples of low-basicity solutions which are used for washing purposes include aqueous solutions containing sodium hydroxide, potassium hydroxide, lithium hydroxide, sodium carbonate, potassium carbonate, ammonium hydroxide, sodium hydrogencarbonate, potassium hydrogencarbonate, tetramethylammonium hydroxide, etc. In particular, aqueous solutions containing sodium hydrogencarbonate, sodium carbonate, potassium hydrogencarbonate, potassium carbonate, sodium hydrogencarbonate [sic], potassium hydrogencarbonate [sic], etc., are especially desirable.

The carbonic acid diester and diphenyl carbonate should be distilled after they have been washed with hot water according to the aforementioned procedures.

The total sodium ion concentration of the aforementioned feed material should be 1.0 ppm or lower, preferably 0.5 ppm or lower. If the sodium concentration is kept below the aforementioned level, a virtually coloration-free polycarbonate can be obtained.

The sodium ion content of the feed material can be determined by means of atomic absorption analysis and derivative bond plasma light-emitting analysis.

Various purification techniques (e.g., distillation, recrystallization, phenol adduct method, etc.), can be used to control the sodium ion concentration of the aforementioned feed material below the aforementioned level.

When the aforementioned aromatic organic compound which has two hydroxyl groups and carbonic acid diester are melt-polycondensed in order to manufacture a polycarbonate, (a) an alkali metal-containing compound and/or an alkaline earth metal-containing compound should be used. Especially desirable results are obtained if at least one type of catalyst selected among (a) an alkali metal-containing compound and/or an alkaline earth metal-containing compound, (b) nitrogen-containing basic compound, and (c) boric acid or its ester is used.

Concrete examples of said alkali metal-containing compounds (a) include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylate, sodium benzoate, potassium benzoate, lithium benzoate, disodium hydrogenphosphate, dipotassium hydrogenphosphate, dilithium hydrogenphosphate, bisphenol A disodium salt, dipotassium salt, dilithium salt, phenol sodium salt, potassium salt, lithium salt, etc.

Concrete examples of alkaline earth metal-containing compounds (a) include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc.

Concrete examples of nitrogen-containing basic compounds (b) include ammonium hydroxides which contain alkyl, aryl, or aralkyl groups (e.g., tetramethylammonium hydroxide (Me$_4$NOH), tetraethylammonium hydroxide (Et$_4$NOH), tetrabutylammonium hydroxide (Bu$_4$NOH), trimethylbenzylammonium hydroxide

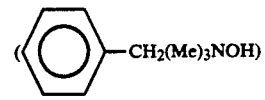

etc ), tertiary amines (e.g., trimethylamine, triethylamine, dimethylbenzylamine, triphenylamine, etc.), secondary amines represented by R$_2$NH (in which R is an alkyl group (e.g., methyl, ethyl, etc.) or aryl group (e.g., phenyl, toluyl, etc.), primary amines represented by RNH$_2$ (in which R is the same as the aforementioned definition), ammonia, and basic salts (e.g., tetramethylammonium borohydride (Me$_4$NBH$_4$), tetrabutylammonium borohydride (Bu$_4$NBH$_4$), tetrabutylammonium tetraphenylborate (Bu$_4$NBPh$_4$), tetramethylammonium tetraphenylborate (Me$_4$NBPh$_4$), etc.).

Of the aforementioned examples, the tetraalkylammonium hydroxides are especially desirable.

As boric acid or boric acid esters (c), boric acid or boric acid esters represented by the following general formula: $B(OR)_n(OH)_{3-n}$ (in which R is an alkyl group (e.g., methyl, ethyl, etc.), or an aryl group (e.g., phenyl, etc.); n is 1, 2, or 3) can be used.

Concrete examples of the aforementioned boric acid esters include trimethyl borate, triethyl borate, tributyl borate, trihexyl borate, triheptyl borate, triphenyl borate, tritoluyl borate, trinaphthyl borate, etc.

The quantity of the aforementioned nitrogen-containing basic compound (b) with respect to 1 mol of the aforementioned aromatic organic compound which has two hydroxyl groups should be $10^{-6}$ to $10^{-1}$ mol, preferably $10^{-5}$ to $10^{-2}$ mol. The quantity of the alkali metal-containing compound or alkaline earth metal-containing compound (a) should be $10^{-8}$ to $10^{-3}$ mol, more preferably $10^{-7}$ to $10^{-4}$ mol, or most preferably $10^{-7}$ to $10^{-5}$ mol.

The quantity of the boric acid or boric acid ester (c) should be $10^{-8}$ to $10^{-1}$ mol, more preferably $10^{-7}$ to $10^{-2}$ mol, or most preferably $10^{-6}$ to $10^{-4}$ mol.

If at least one member selected among (a) an alkali metal-containing compound and/or an alkaline earth metal-containing compound, (b) nitrogen-containing basic compound, and (c) boric acid or its ester is used as a catalyst, a high polymerization activity can be obtained. Thus, a high-molecular-weight polycarbonate can be produced. The resulting polycarbonate has excellent heat resistance and water resistance as well as an improved hue and superb transparency.

If a ternary catalyst consisting of (a) an alkali metal-containing compound and/or an alkaline earth metal-containing compound, (b) nitrogen-containing basic compound, and (c) boric acid or its ester is used as said catalyst, a higher polymerization activity can be obtained. Thus, a high-molecular-weight polycarbonate can be produced. The resulting polycarbonate has excellent heat resistance and water resistance as well as an improved hue and superb transparency.

When the aromatic organic compound which has two hydroxyl groups and carbonic acid diester are polycondensed, conditions commonly used in conventional methods for polycondensing aromatic organic compounds which have two hydroxyl groups with carbonic acid diesters can be used. More specifically, the first-step reaction should be induced by reacting the aforementioned two components at 80°–250° C., more preferably 100°–230° C., or most preferably 120°–190° C., for 0–5 h, more preferably 0–4 h, or most preferably 0.25–3 h, at normal temperature. Then, the pressure of the reaction system is lowered while the reaction temperature is raised. After the aromatic organic compound which has two hydroxyl groups and carbonic acid diester have further reacted, the aromatic organic compound which has two hydroxyl groups and the carbonic acid diester are polycondensed at 240°–320° C. at a reduced pressure of 1 mm Hg.

The aforementioned aromatic organic compound which has two hydroxyl groups and the carbonic acid diester may be reacted with one another by the continuous format or batch format. A tank-shaped reaction apparatus, tubular reaction apparatus, or columnar reaction apparatus can be used for inducing the aforementioned reaction.

Concrete examples of polyesters which are used in combination with the aforementioned polycarbonates in the polycarbonate compound of the present invention include a polycondensed polyester derived from an aromatic or aliphatic dicarboxylic acid (or its derivative) and a divalent alcohol or divalent phenol compound, polycondensed polyester derived from an aromatic or aliphatic dicarboxylic acid (or its derivative) and a cycloether compound, polycondensed polyester derived from a metal dicarboxylate and a dihalogen compound, and a polyester obtained by decyclizing and polymerizing a cycloester compound. As acid "derivatives," acid anhydrides, esters, and chlorides can be used.

Concrete examples of aromatic dicarboxylic acids include adipic acid, azelaic acid, sebacic acid, dodecanedicarboxylic acid, terephthalic acid, isophthalic acid, phthalic acid, chlorophthalic acid, etc.

Concrete examples of divalent alcohols include ethylene glycol, propylene glycol, butane-1,4-diol, etc.

Concrete examples of cycloether compounds include ethylene oxide, propylene oxide, etc.

Concrete examples of divalent phenols include bisphenol A, resorcinol, etc.

Concrete examples of cycloester compounds include ε-caprolactone, etc.

The dihalogen compound which is reacted with the metal dicarboxylate is a compound which has been obtained by substituting two hydroxyl groups of the aforementioned divalent alcohol or divalent phenol compound with halogen atoms (e.g., chlorine, bromine, etc.).

Concrete examples of polyesters which have aromatic dicarboxylic acid units derived from aromatic dicarboxylic acids include poly(1,4-butylene terephthalate), polyethylene terephthalate, etc.

As polyesters which have aliphatic dicarboxylic acid units derived from aliphatic dicarboxylic acids, a polyester which has a principal chain which contains a repeating unit represented by the following general formula:

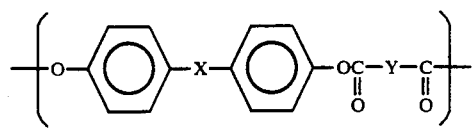

(in which X is selected from

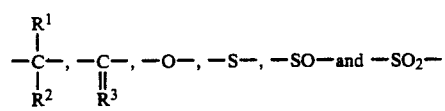

$R^1$ and $R^2$ are selected from a hydrogen atom and univalent hydrocarbon groups; $R^3$ is a divalent hydrocarbon group; the aromatic nucleus may or may not have a univalent hydrocarbon group; Y is an aliphatic hydrocarbon group containing 2–30 carbon atoms) is especially desirable.

In the aforementioned polyester,

is especially desirable as X in said formula, and Y should be selected from $(CH_2)_4$—, —$(CH_2)_9$—, —$(CH_2)_{10}$— and —$(CH_2)_{12}$—.

Concrete examples of methods for manufacturing the aforementioned polyester which has a principal chain consisting of an aliphatic dicarboxylic acid unit and an aromatic diol unit include a method in which an aliphatic dicarboxylic halide and an aromatic diol are reacted with one another by the interfacial method or solution method, a method in which an aliphatic dicarboxylic acid ester and an aromatic diol are reacted with one another, a method in which an aliphatic dicarboxylic acid and an acetylated aromatic diol are reacted with one another, and a method in which an aliphatic dicarboxylic acid and an aromatic diol are reacted with one another in the presence of an esterifying agent (e.g., carbonic acid diester, etc.).

Of all conceivable methods for manufacturing said polyester which has a principal chain consisting of an aliphatic dicarboxylic acid unit and an aromatic diol unit, a method in which an aliphatic dicarboxylic acid and an aromatic diol are directly melt-polycondensed in the presence of diphenyl carbonate is especially desirable.

In the polycarbonate compound or polyester-polycarbonate compound of the present invention, the relative quantities of the polycarbonate and polyester (i.e., polycarbonate/polyester ratio) should be 40–95 parts by weight/60–5 parts by weight, more preferably 55–95 parts by weight/45–5 parts by weight, or most preferably 65–93 parts by weight/35–7 parts by weight.

If the relative quantities of the polycarbonate and polyester in the polycarbonate compound are kept within the aforementioned range, the polyester-polycarbonate compound obtained by melt-mixing the aforementioned components has not only excellent impact resistance and transparency (which are characteristic of the polycarbonate) but also an excellent fluidity.

Various additives (e.g., pigments, dyes, reinforcements, fillers, flame retardants, heat resistance enhancers, stabilizers, antioxidants, weather resistance enhancers, lubricants, mold-release agents, crystalline nucleating agents, plasticizers, fluidity enhancers, antistatic agents, etc.), may also be added to the polycarbonate compound of the present invention as long as they exert no adverse effects on the objectives of the present invention.

Concrete examples of the aforementioned reinforcements and fillers ("reinforcing fillers" hereafter) include metal (e.g., aluminum, iron, nickel, titanium, etc.), oxides or silicates such as mica, aluminum siliate, talc, asbestos, titanium dioxide, silica-lime, novaculite, potassium titanate, titanate whisker, glass flake, glass beads, glass fiber, etc.), carbon filaments, polymer fibers, etc. The aforementioned reinforcing fillers may be used either alone or in combination.

The quantities of said reinforcing fillers with respect to the total weight of the polycarbonate compound should be 1-60 wt%, preferably 5-50 wt %.

Of the aforementioned reinforcing fillers, glass-based reinforcing fillers are especially desirable. For example, a glass-containing mixture of glass and talc, glass and mica, or glass and aluminum silicate can be appropriately used. When glass filaments are used, filaments which have been manufactured based on mechanical tensile forces are especially desirable. The diameters of these filaments should be 0.00012-0.00075.

As the aforementioned flame retardants, inorganic antimony-containing compounds and organic antimony-containing compounds can be appropriately used.

Concrete examples of said inorganic antimony-containing compounds include antimony oxide ($Sb_2O_3$), antimony phosphate, $Ksb(OH)_6$, $NH_4SbF_6$, $SbS_3$, etc.

As organic antimony-containing compounds, esters derived from organic acids and antimony, cycloalkylantimonous acid esters, arylantimonate compounds, etc., can be used. Concrete examples of especially desirable organic antimony-containing compounds include Sb caproate, $Sb(OCH_2CH_3)$, $Sb(OCH(CH_3)CH_2CH_3)_3$, Sb polymethylene glycolate, triphenylantimony, etc. Of the aforementioned examples, antimony oxide is especially desirable.

Concrete examples of stabilizers or antioxidants include [sterically] hindered phenols, phosphites, metal phosphates, metal phosphites, etc.

The polyester-polycarbonate compound of the present invention is obtained by melt-mixing the aforementioned polycarbonate compound which contains said polycarbonate and polyester (as well as various additives, if necessary).

The light transmittance of the resulting polyester-polycarbonate compound is 75% or higher, preferably 80% or higher, or most preferably 85% or higher. The glass transition point (Tg), which is measured using a DSC (differential scanning calorimeter), is different from those of the feed polyester and polycarbonate.

Concrete examples of techniques for mixing the aforementioned feed materials include a method in which a feed mixture obtained by mixing and dispersing said ingredients using an appropriate high-speed mixer (e.g., tumble mixer, Henschell mixer, etc.), are melt-mixed using a monoaxial extruder, biaxial extruder, Banbury mixer, roll, polymerization container, etc., and a method in which the polycarbonate is first polycondensed, in which the feed materials other than the polycarbonate (e.g., polyester, etc.) are subsequently placed into the polycarbonate polycondensation container, and in which the contents are melt-mixed.

EFFECTS OF THE INVENTION

As far as the polycarbonate compound of the present invention, polyester-polycarbonate compound, and its manufacturing method are concerned, 60-95 parts by weight of a polycarbonate with a terminal hydroxyl group concentration of 5-95 mol % and 40-5 parts by weight of polyester are used. Thus, a moderate transesterification is induced between the polycarbonate and polyester constituting said compound. As a result, a polyester-polycarbonate compound which has excellent impact resistance and transparency as well as desirable fluidity can be obtained.

In the paragraphs to follow, the contents of the present invention will be explained in further detail with reference to application examples. It should be noted, however, that the scope of the present invention is in no way restricted to these examples.

APPLICATION EXAMPLES

The physical properties of the polycarbonates obtained in the following application examples were measured according to the following procedures:

Terminal OH group concentration: after 0.25 [sic] of each sample was dissolved in 10 mL of methylene chloride, the OH group absorbance in the vicinity of 3,580 $cm^{-1}$ was measured using FT-IR (FT-IR4300, manufactured by Shimazu, Ltd.) to compute the terminal OH group concentration.

Polymer sodium content: 20 [sic] of each polymer were incinerated, and the resulting ashes underwent an atomic absorbance measurement (measurement instrument: Hitachi 180-80, manufactured by Hitachi, Ltd.). The critical level was 0.05 ppm.

Polymer chlorine content: after 50 mg of each polymer were gassified by the Schoriger method, an aqueous solution containing said gas underwent ion chromatographic analysis (Ion Chromatograph 2000i, manufactured by Dionex Co.). The critical level was 0.05 ppm.

Intrinsic viscosity (IV): measurements were carried out in methylene chloride (0.5 dL/g) at 20° C. using a Uberhode viscometer.

Light transmittance: measurements were carried out using a press sheet (thickness: 3 mm) according to the procedures specified in ASTM D 1003.

Haze: measurements were carried out using NDH-200 (manufactured by Nippon Denshoku Kogyo Co.).

Melt index (MI): measurements were carried out at 300° C. and at a load of 1.2 kg according to the procedures specified in JIS K-7210.

Izod impact strength: measurements were carried out using a 3.5×12.7×2 [sic] (rear notch) injection-molded testpiece according to the procedures specified in ASTM D 256.

Glass transition point (Tg): each resin underwent differential thermal analysis at a temperature-increasing rate of 10° C./min using differential scanning calorimeter MODEL DSC-2 (manufactured by Perkin-Elmer Co.).

Polycarbonate Production Examples

PRODUCTION EXAMPLE 1

After 0.440 kg-mol of bisphenol A (manufactured by Nippon GE Plastics Co.) and 0.431 kg-mol of diphenyl carbonate (manufactured by GE Co.) were placed into a 250-L tank-shaped agitation bath, the atmosphere was replaced with nitrogen. Then, the contents were dissolved at 140° C. Then, the temperature was raised to 180° C., and after 0.0011 g-mol of boric acid was added, the contents were agitated for 30 min. Then, 0.11 g-mol of tetramethylammonium hydroxide and 0.00044 g-mol of sodium hydroxide were added as catalysts, and the temperature was raised to 240° C. while the pressure was gradually lowered to 20 mm Hg. The quantity of distilled phenol was monitored while the temperature and pressure were maintained at constant levels, and when the distillation of phenol stopped, the pressure was raised to atmospheric pressure using hydrogen. The total reaction time was 2 h. The intrinsic viscosity ($\eta$) of the resulting reaction mixture was 0.14 dL/g.

The resulting reaction mixture was compressed using a gear pump, and after it was placed into a centrifugal thin-membrane evaporator, it was further reacted. The temperature and pressure of said thin-membrane evaporator were maintained at 295° C. and 2 mm Hg, respectively. After a prepolymer was removed from the lower segment of said evaporator via a gear pump, it was processed into strands in a nitrogen atmosphere. Then, said strands were pelletized using a cutter. The intrinsic viscosity of the resulting prepolymer ($\eta$) was 0.35 dL/g.

After the resulting prepolymer was placed into a biaxial horizontal agitation-type polymerization bath (L/D=6; agitation blade rotation diameter [sic]: 150 mm; content volume: 40 L) at 290° C. and 0.2 mm Hg using an extruder at a rate of 40 kg/h, said prepolymer was polymerized over a residing period of 30 min. The intrinsic viscosity (IV) and terminal hydroxyl group concentration of the resulting polymer were 0.50 dL/g and 70 mol %, respectively.

The results are summarized in Table I.

PRODUCTION EXAMPLE 2

Polymerization procedures identical to those in Production Example 1 were carried out except that the quantity of diphenyl carbonate was changed to 0.446 kg-mol. The intrinsic viscosity (IV) and terminal hydroxyl group concentration of the resulting polymer were 0.50 dL/g and 30 mol %, respectively.

The results are summarized in Table I.

PRODUCTION EXAMPLE 3

Polymerization procedures identical to those in Production Example 1 were carried out except that the quantity of diphenyl carbonate was changed to 0.451 kg-mol and that the temperature of the biaxial horizontal agitation-type polymerization bath was changed to 293° C. The intrinsic viscosity (IV) and terminal hydroxyl group concentration of the resulting polymer were 0.50 dL/g and 10 mol %, respectively.

The results are summarized in Table I.

REFERENCE EXAMPLE

Lexan 141-grade Powder (manufactured by Nippon GE Plastics Co.) was extruded and pelletized using a 40 mm $\phi$ monoaxial extruder (manufactured by Nikko Co.) at 280° C.

The intrinsic viscosity (IV) and terminal hydroxyl group concentration of the resulting polymer were 0.50 dL/g and 0 mol %, respectively.

The results are summarized in Table I.

TABLE I

| PRODUCTION EXAMPLE | TERMINAL HYDROXYL GROUP CONCENTRATION (mol %) | IV (dl/g) | LIGHT TRANSMITTANCE (%) | HAZE | MI | NOTCHED IZOD | HUE | Na CONTENT (ppm) | Cl CONTENT (ppm) | Tg (°C.) |
|---|---|---|---|---|---|---|---|---|---|---|
| 1 | 70 | 0.50 | 90 | 0.9 | 8.7 | 80 or higher | Colorless and Transparent | 0.09 | 4.03 | 149 |
| 2 | 30 | 0.50 | 90 | 0.8 | 8.6 | 80 or higher | | 0.09 | 4.21 | 149 |
| 3 | 10 | 0.50 | 90 | 0.9 | 8.7 | 80 or higher | Transparent | 0.09 | 4.12 | 149 |
| REFERENCE EXAMPLE | 0 | 0.50 | 90 | 0.9 | 8.7 | 80 or higher | Colorless and Transparent | <0.05 | 21.35 | 149 |

APPLICATION EXAMPLE 1

After adipic acid, bisphenol A, and diphenyl carbonate were mixed with one another at a molar ratio of 1:1:2.1, $2.5 \times 10^{-4}$ mol of tetramethylammonium hydroxide and $0.01 \times 10^{-4}$ mol of lithium hydroxide were added to the resulting mixture (with respect to 1 mol of bisphenol A). Then, the contents were refluxed, agitated, and transesterified in a nitrogen stream at 180° C. for 30 min.

Then, the temperature was raised to 210° C., and after the pressure was gradually lowered to 200 mm Hg, the temperature was raised to 240° C. over a 1-h period. After pressure was gradually lowered to 150 mm Hg over a 20-min period at [sic; from] 200 mm Hg, the pressure was further lowered to 100 mm Hg over a 20-min period. After the pressure was further lowered to 15 mm Hg, the contents were reacted for 30 min. After the temperature was raised to 270° C., the contents were reacted from 2 h (final pressure: 0.5 mm Hg). As a result, a polyester with an IV value of 0.45 dL/g was obtained. The resulting polyester was light-yellow and transparent.

100 parts by weight of the polycarbonate obtained in Production Example 1 (terminal hydroxyl group concentration: 70 mol %) and 33.3 parts by weight of the resulting polyester (bisphenol A unit:adipic acid unit molar ratio: 100:20) were mixed and pelletized using a 40 mm $\phi$ monoaxial extruder (manufactured by Nikko Co.) at 280° C.

The physical properties of the resulting polymer are summarized in Table II.

APPLICATION EXAMPLE 2

Procedures identical to those in Application Example 1 were carried out except that the polycarbonate obtained in Production Example 2 (terminal hydroxyl group concentration: 30 mol %) was used in place of the polycarbonate obtained in Production Example 1 (terminal hydroxyl group concentration: 70 mol %).

The results are summarized in Table II.

APPLICATION EXAMPLE 3

Procedures identical to those in Application Example 1 were carried out except that the polycarbonate obtained in Production Example 3 (terminal hydroxyl group concentration: 10 mol %) was used in place of the polycarbonate obtained in Production Example 1 (terminal hydroxyl group concentration: 70 mo; %).

The results are summarized in Table II.

APPLICATION EXAMPLE 4

After dodecanedicarboxylic acid, bisphenol A, and diphenyl carbonate were mixed with one another at a molar ratio of 1:1:2.1, $2.5 \times 10^{-4}$ mol of tetramethylammonium hydroxide and $0.01 \times 10^{-4}$ mol of lithium hydroxide were added to the resulting mixture (with respect to 1 mol of bisphenol A). Then, the contents were refluxed, agitated, and transesterified in a nitrogen stream at 180° C. for 30 min.

Then, the temperature was raised to 210° C., and after the pressure was gradually lowered to 200 mm Hg, the temperature was raised to 240° C. over a 1-h period. After the pressure was gradually lowered to 150 mm Hg over a 20-min period at [sic; from] 200 mm Hg, the pressure was further lowered to 100 mm Hg over a 20-min period. After the pressure was further lowered to 15 mm Hg, the contents were reacted for 30 min. After the temperature was raised to 270° C., the contents were reacted for 1-h (final pressure: 0.5 mm Hg). Thus, a polyester with an IV value of 0.56 dL/g was obtained. The resulting polyester was faint yellow and transparent.

100 parts by weight of the polycarbonate obtained in Production Example 2 (terminal hydroxyl group concentration: 30 mol %) and 18.4 parts by weight of the resulting polyester (bisphenol A unit:adipic acid unit molar ratio: 100:10) were mixed and pelletized using a 40 mm $\phi$ monoaxial extruder (manufactured by Nikko Co.) at 280° C.

The results are summarized in Table II.

APPLICATION EXAMPLE 5

100 parts by weight of the polycarbonate obtained in Production Example 1 (terminal hydroxyl group concentration: 70 mol %) and 21.7 parts by weight of polybutylene terephthalate (Barox 295-1001, manufactured by Nippon GE Plastics Co.) (bisphenol A unit:terephthalic acid unit molar ratio: 80:20) were mixed and pelletized using a 40 mm $\phi$ monoaxial extruder (manufactured by Nikko Co.) at 280° C. The glass transition point of polybutylene terephthalate is 45° C.

The results are summarized in Table II.

APPLICATION EXAMPLE 6

Procedures identical to those in Application Example 5 were carried out except that the polycarbonate obtained in Production Example 2 (terminal hydroxyl group concentration: 30 mol %) was used in place of the polycarbonate obtained in Production Example 1 (terminal hydroxyl group concentration: 70 mol %).

The results are summarized in Table II.

APPLICATION EXAMPLE 7

Procedures identical to those in Application Example 5 were carried out except that the polycarbonate obtained in Production Example 3 (terminal hydroxyl group concentration: 10 mol %) was used in place of the polycarbonate obtained in Production Example 1 (terminal hydroxyl group concentration: 70 mol %).

The results are summarized in Table II.

COMPARATIVE EXAMPLE 1

Procedures identical to those in Application Example 1 were carried out except that the polycarbonate obtained in the reference example (terminal hydroxyl group concentration: 0 mol %) was used in place of the polycarbonate obtained in Production Example 1 (terminal hydroxyl group concentration: 70 mol %).

The results are summarized in Table II.

COMPARATIVE EXAMPLE 2

Procedures identical to those in Application Example 1 or 4 [sic] were carried out except that the polycarbonate obtained in the reference example (terminal hydroxyl group concentration: 0 mol %) was used in place of the polycarbonate obtained in Production Example 1 (terminal hydroxyl group concentration: 70 mol %).

The results are summarized in Table II.

COMPARATIVE EXAMPLE 3

Procedures identical to those in Application Example 1 or 5 [sic] were carried out except that the polycarbonate obtained in the reference example (terminal hydroxyl group concentration: 0 mol %) was used in place of the polycarbonate obtained in Production Example 1 (terminal hydroxyl group concentration: 70 mol %).

The results are summarized in Table II.

TABLE II

| Comparative Example | LIGHT TRANSPARENCY (%) | HAZE | MI (g/10-min) | IZOD (kg cm/cm) | HUE | Tg (°C.) |
|---|---|---|---|---|---|---|
| 1 | 89 | 1.2 | 32 | >80 | Faint Yellow And Transparent | 129 |
| 2 | 89 | 1.4 | 30 | >80 | Faint Yellow And Transparent | 130 |
| 3 | 89 | 1.6 | 25 | >80 | Faint Yellow And Transparent | 130 |
| 4 | 89 | 1.2 | 26 | >80 | Colorless and Transparent | 129 |
| 5 | 89 | 1.2 | 30 | >80 | Light Yellow And Transparent | 117 |
| 6 | 89 | 1.3 | 28 | >80 | Light Yellow And Transparent | 119 |
| 7 | 89 | 1.5 | 23 | >80 | Light Yellow And Transparent | 121 |
| 1 | 68 | 22 | 17 | 50 | Faint Yellow and Semi-transparent | 136 |
| 2 | 70 | 20 | 16 | 50 | Colorless and Semi-transparent | 135 |
| 3 | 65 | 26 | 18 | 50 | Light Yellow and Semi-transparent | 47,127 |

What is claimed is:

1. A polycarbonate composition which contains 60 to 95 parts by weight of a polycarbonate with a terminal hydroxyl group concentration of 5 to 95 mole percent and 40 to 5 parts by weight of a polyester wherein said polyester consists of an aliphatic dicarboxylic acid unit and an aromatic organic diol unit.

2. The composition in accordance with claim 1 in which said polyester has a principal chain which contains a repeating unit represented by the following general formula:

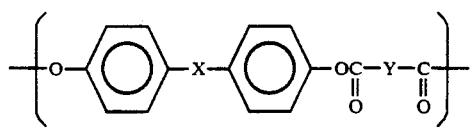

in which X is selected from

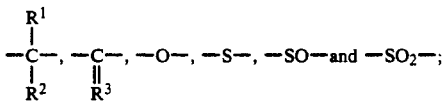

$R^1$ and $R^2$ are selected from a hydrogen atom and univalent hydrocarbon groups; $R^3$ is a divalent hydrocarbon group; the aromatic nucleus may or may not have a univalent hydrocarbon group; and Y is an aliphatic hydrocarbon group containing 2–30 carbon atoms.

* * * * *